(12) United States Patent
Bednarz, III et al.

(10) Patent No.: US 8,573,550 B1
(45) Date of Patent: Nov. 5, 2013

(54) RADAR ANTENNA SAFETY BRACE

(75) Inventors: Edward T. Bednarz, III, Tobyhanna, PA (US); Bryan J. Causer, Scranton, PA (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 270 days.

(21) Appl. No.: 13/068,465

(22) Filed: Apr. 28, 2011

(51) Int. Cl.
*A47B 96/06* (2006.01)

(52) U.S. Cl.
USPC ........... 248/230.4; 248/313; 248/903; 70/299

(58) Field of Classification Search
USPC .......... 248/82, 228.4, 230.4, 309.2, 313, 314, 248/316.5, 346.01, 903; 70/178, 202, 232, 70/299, DIG. 56
See application file for complete search history.

(56) References Cited

U.S. PATENT DOCUMENTS

| | | | |
|---|---|---|---|
| 1,251,591 A * | 1/1918 | Stoddart | 70/299 |
| 3,135,555 A | 6/1964 | MeCaskey | |
| 3,157,435 A | 11/1964 | Sherven et al. | |
| 4,373,851 A * | 2/1983 | Confoey | 414/722 |
| 4,417,644 A * | 11/1983 | Brogard | 180/287 |
| 6,520,067 B1 * | 2/2003 | Hunt et al. | 92/23 |
| 7,182,543 B2 * | 2/2007 | Kondo et al. | 403/41 |
| 7,694,487 B1 * | 4/2010 | Ryan | 52/741.15 |
| 8,201,506 B1 * | 6/2012 | Parlapiano | 109/50 |

* cited by examiner

*Primary Examiner* — Gwendolyn Baxter
(74) *Attorney, Agent, or Firm* — Azza Jayaprakash

(57) ABSTRACT

A safety brace for supporting a radar antenna platform movable to an elevated tilted position by a drive shaft having a movable first member and a second member, wherein the first member is movable toward and away from the second member. The safety brace has an elongated cylindrical tube formed of two separable half tubes. Three spaced apart separable coupling brackets are secured to the half tubes across a seam. When the separable brackets are closed, the half tubes are kept in a closed configuration. Two hinged coupling brackets are secured to the half tubes along the opposite seam. Flanges disposed at each of the ends of the elongated tube are configured to abut against the movable first and second members of the drive shaft. The safety brace has gussets secured between the flanges and adjacent outer surface portions of the half tubes. A safety brace system and a method of operating the safety brace are also disclosed.

23 Claims, 17 Drawing Sheets

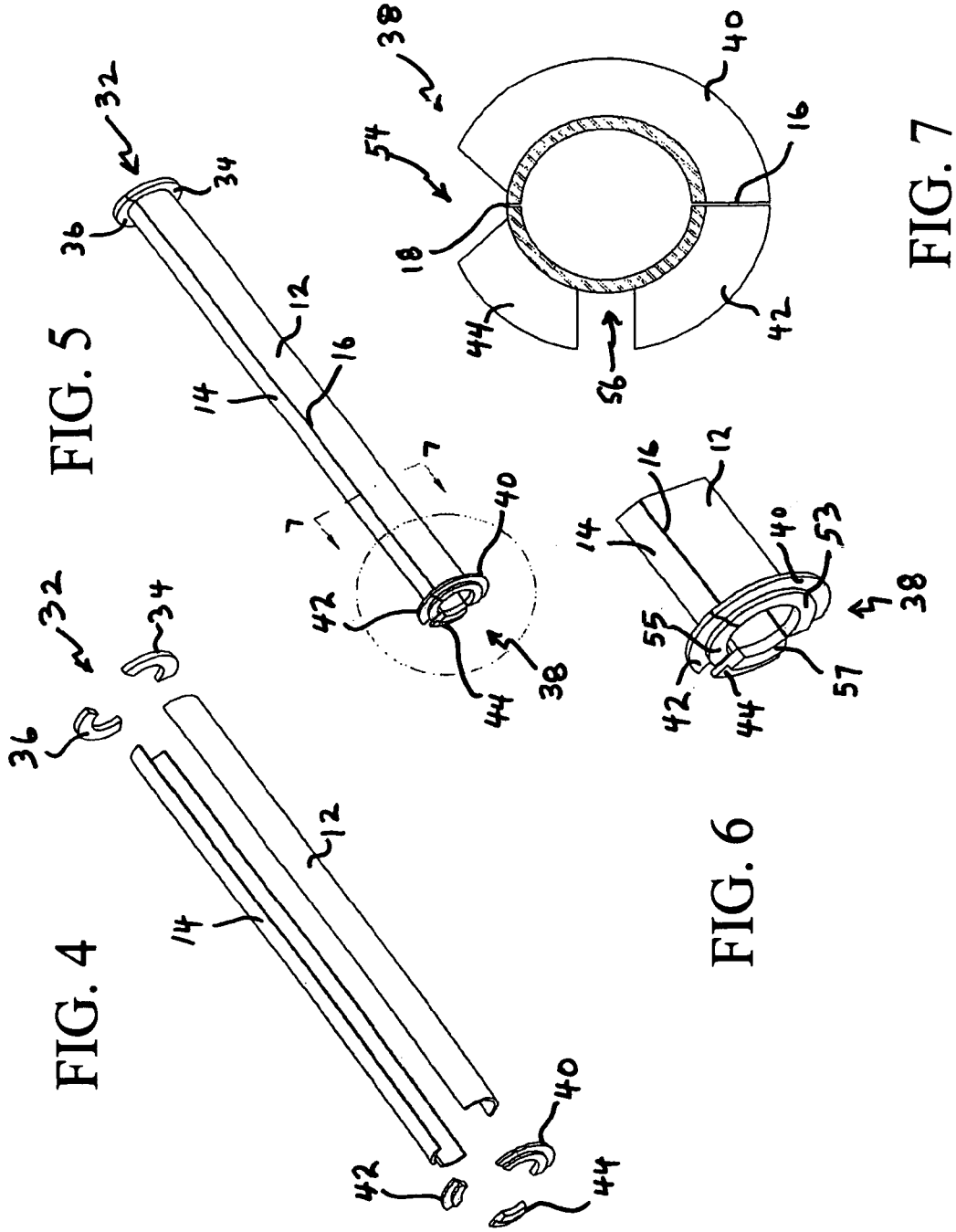

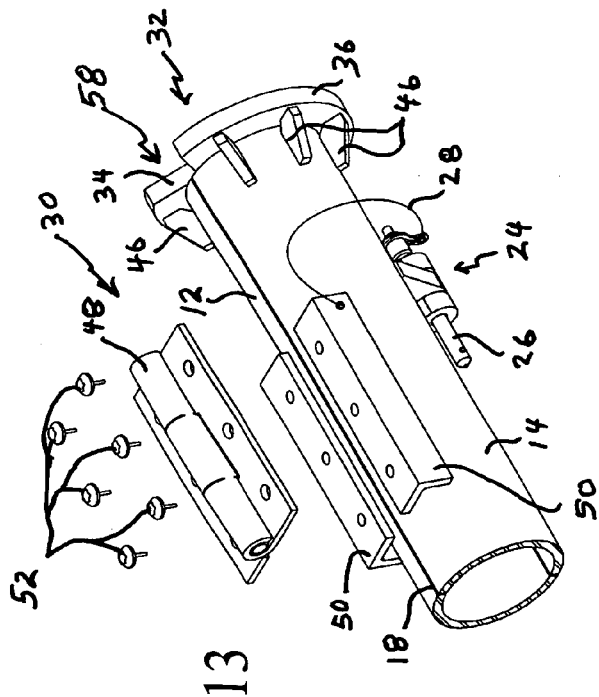
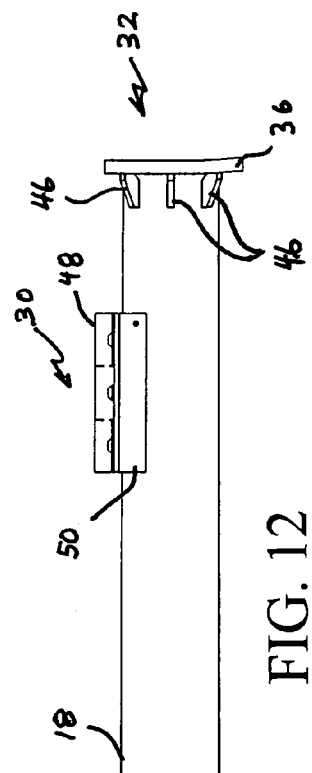
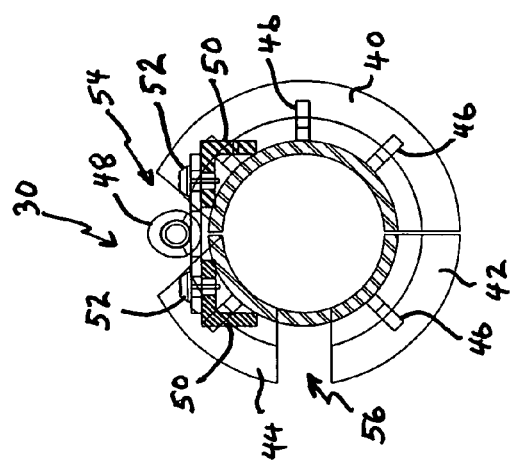
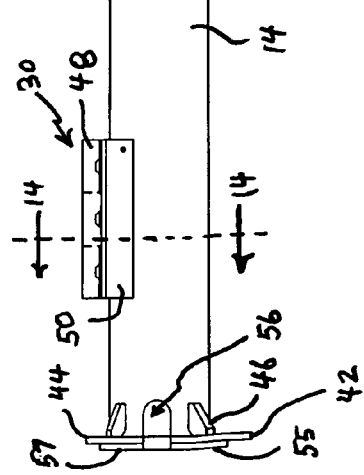
FIG. 13
FIG. 12
FIG. 14

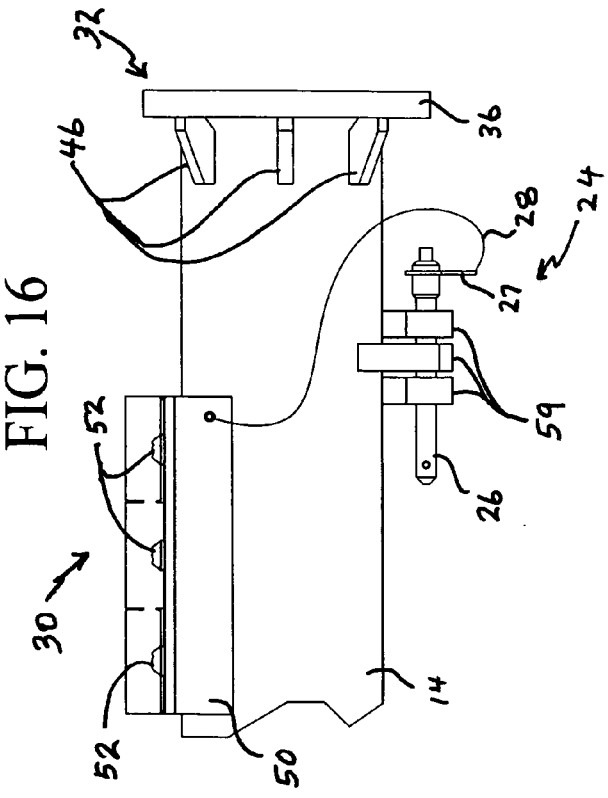
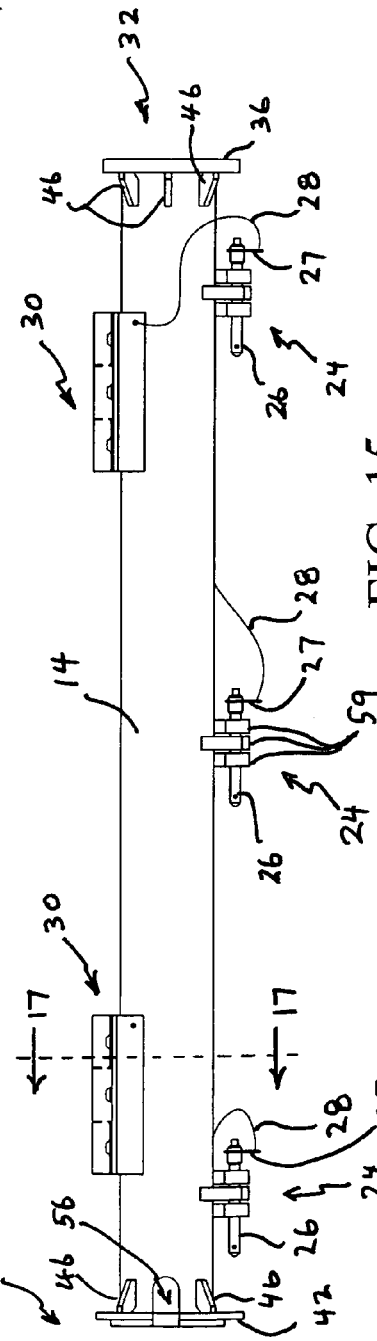
FIG. 16
FIG. 17
FIG. 15

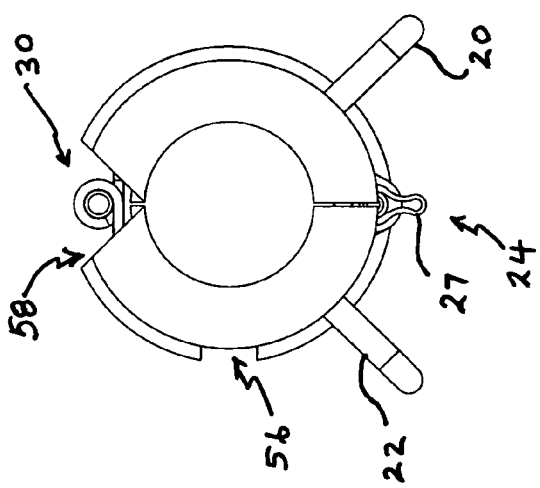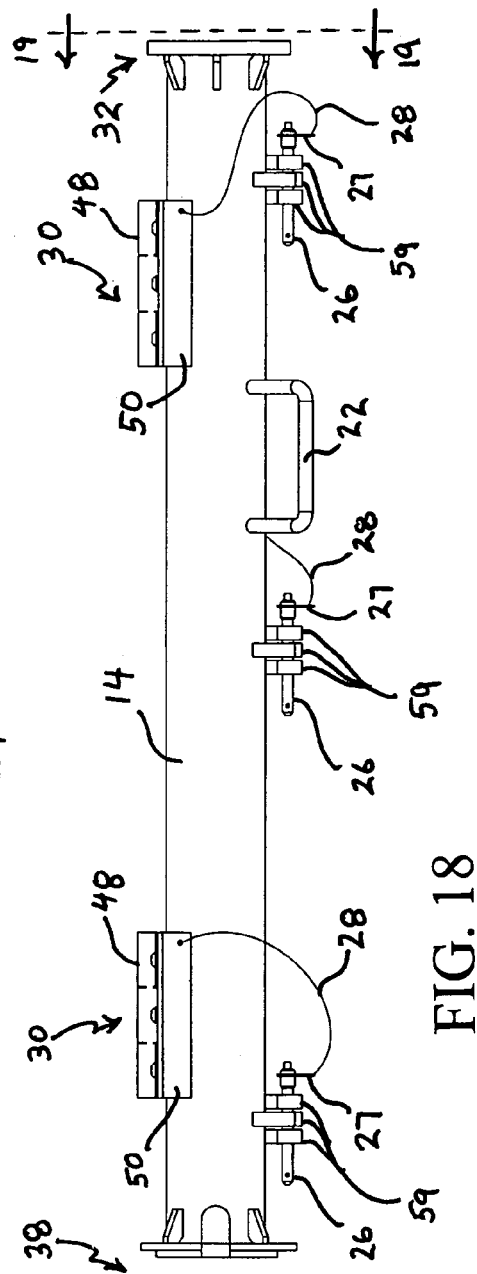

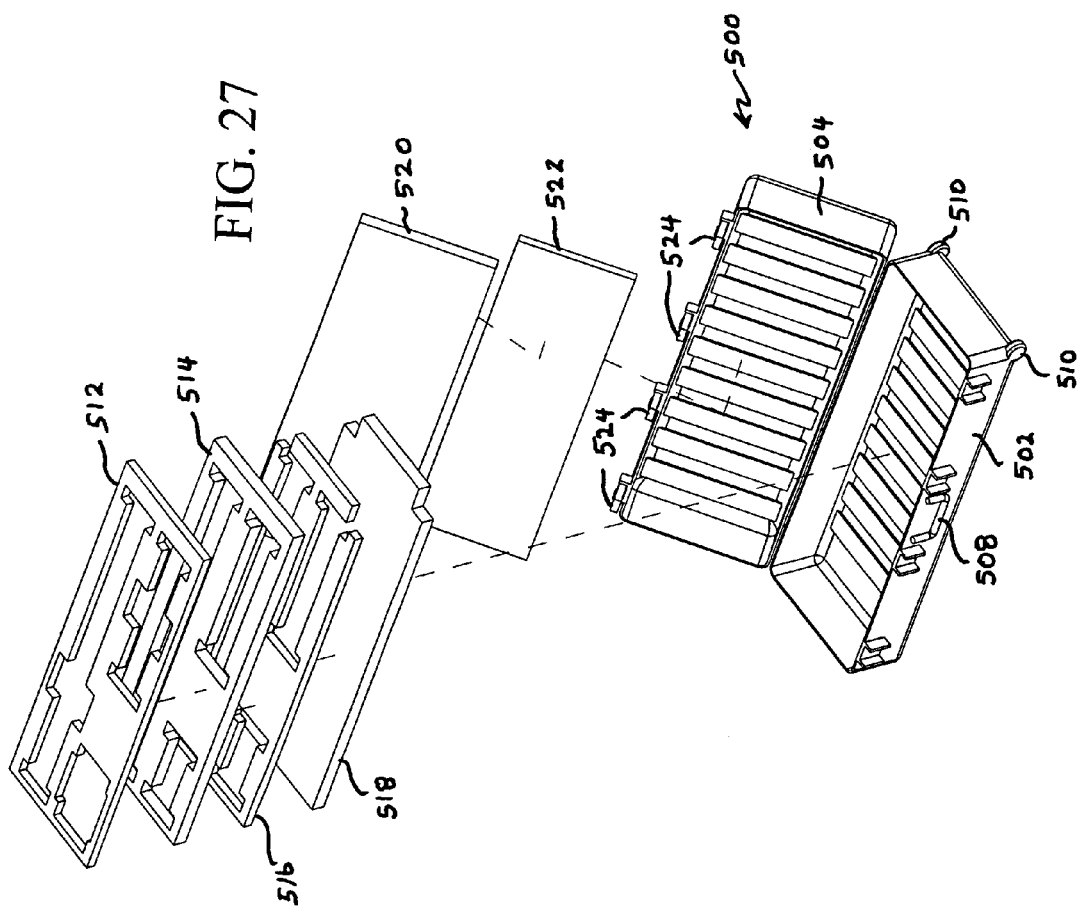

RADAR ANTENNA SAFETY BRACE

GOVERNMENT INTEREST

The invention described herein may be manufactured, used, imported, sold, and licensed by or for the Government of the United States of America without the payment to me of any royalty thereon.

FIELD OF THE INVENTION

The present invention relates generally to safety braces and supports for raised platforms and, more particularly, to a safety brace for a communications platform such as the AN/TPQ-37(V)9 Radar Antenna used by the U.S. Army.

BACKGROUND OF THE INVENTION

Various devices for supporting elevated beds of trucks are known. U.S. Pat. No. 3,135,555, issued to MeCaskey, is directed to a safety guard for hydraulic hoists. As shown in FIG. 1, the body frame 20 of a dump truck body 15 is raised and lowered via two hydraulic rams 22. The rams 22 have a cylinder 25 and a rod 26 that is coupled at its free end 29 via bosses 30 to a cross rod 31 as shown in FIG. 1. A safety guard 35 is shown in FIG. 2 for embracing the rod 26 and locking the hydraulic ram in an extended condition. The guard 35 comprises a tube 36 split lengthwise to provide half sections 39 and 40 that are hingedly connected so as to open up for fitting around the rod 26 of an hydraulic ram. The two guard halves 39 and 40 are preferably connected along one meeting line (37) by a single piano hinge 45. At the other meeting line 38, two ears 59 and 60 are welded to the half sections 39 and 40. Each of the ears has a bore through which a locking means 55 such as a hook, pin, bolt or the like can be used to hold the ears together. In the embodiment shown in the figures, a bolt 72 extends through the bores and is secured by a nut 73.

In U.S. Pat. No. 3,157,435, issued to Sherven, a safety device is shown for use on dump trucks, trailers, and similar vehicles. FIGS. 2 through 7 illustrate the. structural features of safety prop A. A flat baseplate 10, which is adapted for mounting on one of the cross members of the truck frame B, is equipped with a pair of laterally spaced upstanding apertured lugs 12, 14 into which a hinge pin 16 is received and held in place by cotter pins 18. As shown in FIG. 1 and FIGS. 8 through 11, the axis of hinge pin 16 is generally horizontal permitting safety prop A to rotate in a limited vertical plane with respect to frame B of truck C. Further included is hollow generally elongated cylindrical supporting member or barrel 20 having a solid lower end plate 22 from which extend longitudinally therefrom a pair of spaced apertured lugs 24, 26 adapted to pivotally mount upon hinge pin 16 between lugs 12 and 14 of base plate 10. A dump truck body engaging member or piston 30 is telescopically positioned within supporting member 20. As shown in FIGS. 2 and 3, a compression spring member 50 is mounted within supporting member 20. Releasable latching means is provided for holding member 30 in a retracted position within member 20.

In the Sherven device, the safety prop A is separate and apart from the hoisting mechanism E that can be actuated to raise the dump body D as shown in FIG. 8. After actuating hoisting mechanism E, the spring member 50 of safety prop A is released to extend member 30 and jaw 40 into engagement with the cross member 41 of dump body D. Then hoisting mechanism E is actuated to let the dump body D settle onto the jaw 40. In this manner, the weight member 30 is pushed into a latched or cocked position within member 20 as shown in FIG. 9. When not needed, the safety prop can be deployed or lowered into the position as shown in FIG. 11.

A locking device for a bulldozer and backhoe is described in U.S. Pat. No. 4,373,851 issued to Confoey. In particular the locking device is for use on equipment that has hydraulic pistons and cylinders. The Confoey device is a split cylindrical sleeve 10 that has an annular flange 19 at one end and arms 20 and 21 at the other end. The split cylindrical sleeve 10 is formed of equal half sections 11 and 12 that have a pair of pivot hinges 13 therebetween as shown in FIGS. 2 and 3. A pin 16 can be positioned through apertures in L shaped extensions 14 and 15. The pin 16 is secured to the aperture in extension 15 by welding. The pin 16 also extends into a bore in extension 14. Pairs of lugs 17 and 18 are secured to the half sections 11 and 12 on the opposite side of the extensions 14 and 15. Padlocks can pass through apertures in lugs 17 and 18. In this manner the half sections 11 and 12 can be secured about a rod R of cylinder assembly 30 of a backhoe 25. The flange 19 can abut with the end of the piston and cylinder assembly. The opposite end of the split cylindrical sleeve engages the boom 27.

While the above noted devices are beneficial to some degree, they each have limitations that do not make them suitable for use in supporting elevated antenna platforms such as those used by the U.S. Army.

Improperly designed mechanical structures can have catastrophic consequences when such structures fail. One such example involves the gusset plates on the Interstate 35 bridge in Minnesota. Old photos of the bridge show two gusset plates that were visibly bent as far back as 2003. That was four years before the bridge span collapsed into the Mississippi River. In that incident, 13 people were killed.

Another incident involves the Nov. 15, 1988 collapse of the 300 foot telescope in Green Bank, W. Va. It was discovered that the collapse was the result of the sudden failure of a gusset plate in the box girder which provided the main support for the antenna.

In the case of the AN/TPQ-37(V)9 Radar Antenna, there has been one unfortunate accident in which the antenna fell during maintenance and a soldier was killed. Hence there exists a need for an improved safety brace for use with such Radar Antennae.

SUMMARY OF THE INVENTION

The present invention is directed to a safety brace for supporting a radar antenna platform movable to an elevated tilted position by a drive shaft having a movable first member and a second member, wherein the first member is movable toward and away from the second member, comprising an elongated generally cylindrical tube formed of a separable first half tube portion and a second half tube portion. The first half tube portion and the second half tube portion are each generally C shaped in cross section and form longitudinal first and second seams when positioned alongside each other to form the generally cylindrical tube which has a first end and a second end. The safety brace has at least one separable coupling bracket secured to the first half tube portion and the second half tube portion and disposed across the first seam to maintain the first half tube and the second half portions in a generally closed seam configuration when the separable coupling bracket is in a closed position and to maintain the first half tube and the second half portions in an open seam configuration when the separable coupling bracket is opened. The safety brace has at least one hinged coupling bracket secured to the first half tube portion and the second half tube portion and disposed across the second seam to maintain the first half tube and the second half portions in a generally closed seam configuration when the hinged coupling bracket is in a closed position and to allow for opening of the second seam as the hinged coupling bracket is opened.

The safety brace has a first flange disposed at the first end of the elongated generally cylindrical tube and being configured to abut against the movable first member of the drive shaft. A second flange is disposed at the second end of the elongated generally cylindrical tube and is configured to abut against the second member of the drive shaft. A plurality of first gussets are disposed between the first flange and adjacent outer surface portions of the first half tube portion and the second half tube portion. A plurality of second gussets are disposed between the second flange and adjacent outer surface portions of the first half tube portion and the second half tube portion.

In a preferred embodiment of the present invention, the safety brace further comprises three separable coupling brackets spaced apart along the first seam.

In another preferred embodiment, each separable coupling bracket comprises a first separable coupling member disposed on the first half tube portion and a second separable coupling member disposed on the second half tube portion; and a locking pin; the first and second separable coupling members each having an aperture therethrough which line up when the elongated generally cylindrical tube is in a closed configuration whereupon the locking pin can be inserted through the apertures of the first and the second coupling members and lock the elongated generally cylindrical tube in the closed configuration. The safety brace further comprises a lanyard secured at one end to the locking pin and at its other end to an adjacent hinged coupling bracket.

In yet another preferred embodiment, each hinged coupling bracket comprises a first hinged coupling member disposed on the first half tube portion and a second hinged coupling member disposed on the second half tube portion, and a hinge plate secured to the first and the second hinged coupling members across the second seam. The safety brace can comprise two hinged coupling brackets spaced apart along the second seam.

According to a preferred embodiment, each of the first and the second plurality of gussets is generally triangular with one edge secured to a corresponding end flange and another edge secured to a corresponding tube portion.

In an alternative embodiment, each of the generally C shaped first half tube portion and the generally C shaped second half tube portion are generally rectangular in cross section when in a closed configuration. Also each of the first flange and the second flange are generally rectangular.

In yet another alternative embodiment, the safety brace further comprises at least one generally C shaped handle secured to one of the separable first half tube portion and the second half tube portion.

According to another preferred embodiment, the second flange is configured and dimensioned to accommodate any non flat surface of the second member of the drive shaft against which the second flange abuts. The second flange together with corresponding adjacent sections of the first half tube portion and the second half tube portion are configured and dimensioned to form a notch to accommodate a grease fitting of the second member. The first flange is configured and dimensioned to accommodate any non flat surface of the first member of the drive shaft against which the first flange abuts.

The present invention is also directed to a safety brace system for supporting a platform movable to an elevated position by a ram having a base member, a lead screw and a moveable member.

The safety brace system comprises an elongated generally cylindrical tube formed of a separable first half tube portion and a second half tube portion, the first half tube portion and the second half tube portion each being generally C shaped in cross section and forming longitudinal first and second seams when positioned alongside each other to form the generally cylindrical tube, the elongated generally cylindrical tube having a first end and a second end. The safety brace system has at least one separable coupling member secured to the first half tube portion and the second half tube portion and disposed across the first seam to maintain the first half tube and the second half portions in a generally closed seam configuration when the separable coupling member is in a closed position and to maintain the first half tube and the second half portions in an open seam configuration when the separable coupling member is opened.

The safety brace system also has at least one hinged coupling member secured to the first half tube portion and the second half tube portion and disposed across the second seam to maintain the first half tube and the second half portions in a generally closed seam configuration when the hinged coupling member is in a closed position and to allow for opening of the second seam as the hinged coupling member is opened A first flange is disposed at the first end of the elongated generally cylindrical tube and is configured to abut against the moveable member of the ram. A second flange is disposed at the second end of the elongated generally cylindrical tube and is configured to abut against the base member of the ram.

The safety brace system also has a plurality of generally triangular first gussets disposed between the first flange and adjacent outer surface portions of the first half tube portion and the second half tube portion; and a plurality of generally triangular second gussets disposed between the second flange and adjacent outer surface portions of the first half tube portion and the second half tube portion.

According to one preferred embodiment of the present invention, the safety brace system comprises a first separable coupling extension member disposed on and extending from the first half tube portion and a second separable coupling extension member disposed on and extending from the second half tube portion, and a locking pin. The first and second separable coupling extension members each have an aperture therethrough which line up when the elongated generally cylindrical tube is in a closed configuration whereupon the locking pin can be inserted through the apertures of the first and the second extension coupling members and lock the elongated generally cylindrical tube in the closed configuration.

In yet another preferred embodiment of the safety brace system, each hinged coupling member comprises a first hinged coupling member disposed on the first half tube portion and a second hinged coupling member disposed on the second half tube portion, and a hinge plate secured to the first and the second hinged coupling members across the second seam.

In one preferred embodiment of the safety brace system, each of the first and the second plurality of gussets is generally triangular with one edge secured to a corresponding end flange and another edge secured to a corresponding tube portion. The safety brace system further comprises at least one generally C shaped handle secured to one of the separable first half tube portion and the second half tube portion.

Also, the second flange is configured and dimensioned to accommodate any non flat surface of the base member of the ram against which the second flange abuts. Moreover, the second flange comprises lands to accommodate the non flat surface of the base member. The second flange together with corresponding adjacent sections of the first half tube portion and the second half tube portion are configured and dimensioned to form a notch to accommodate a grease fitting of the base member.

The safety brace system has a first flange which is configured and dimensioned to accommodate any non flat surface of the first member of the drive shaft against which the first flange abuts.

In addition to a safety brace, the system includes a transport case.

The present invention is also directed to a method for supporting a platform movable to an elevated position by a ram having a base member, a lead screw and a movable member.

In one preferred embodiment, the method for supporting a platform comprises providing a safety brace according to one embodiment of the present invention. The method also comprises positioning the elongated generally cylindrical tube in an open configuration about the drive shaft after the platform is raised; closing the elongated generally cylindrical tube about the lead screw; abutting the second flange against the base member of the ram; and lowering the platform and abutting the first flange against the movable member of the ram. In an alternative embodiment, the method further includes providing two or more different sized safety braces for use in supporting the platform.

The Radar Antenna Safety Brace of the present invention allows mechanics to perform maintenance safely with the antenna raised in the air. With the antenna up, this creates a hazardous work environment.

The brake on the motor is the only thing preventing the lead screw from rapidly descending. Furthermore, if the motor is inadvertently removed, the mechanic can be seriously injured or killed from the massive weight.

Generally, the brace comprises a tubular assembly with hinge and interlocking mechanisms that engage over the top of the lead screw. End flanges and gussets allow the brace or unit to rest against the top and bottom surfaces of the platform elevating mechanism.

BRIEF DESCRIPTION OF THE DRAWINGS

The following detailed description of the invention is made with reference to the accompanying drawings, in which:

FIG. 4 is an exploded view taken of the tubes and flanges of the safety brace of FIG. 1 in a preassembled form;

FIG. 5 is an assembled view of the tubes and flanges of the safety brace of FIG. 4;

FIG. 6 is a partial enlarged view of the bottom end of the safety brace of FIG. 4 illustrating the bottom flange in accordance with an embodiment of the present invention;

FIG. 7 is a cross-sectional view taken along the direction of the arrows of the line 7-7 in FIG. 5;

FIG. 12 is a side view of the safety brace of FIG. 5 and including the gussets and the hinge assemblies;

FIG. 13 is a partial enlarged view of the top end of the safety brace of FIG. 1 illustrating an exploded view of one of the hinge assemblies in accordance with an embodiment of the present invention;

FIG. 14 is a cross-sectional view taken along the direction of the arrows of the line 14-14 in FIG. 12;

FIG. 15 is an assembled view of the safety brace of FIG. 12 and including the bracket assemblies;

FIG. 16 is a partial enlarged view of the top end of the safety brace of FIG. 15 illustrating a portion of one of the hinge assemblies and its coupling to a bracket assembly in accordance with an embodiment of the present invention;

FIG. 17 is a cross-sectional view taken along the direction of the arrows of the line 17-17 in FIG. 15;

FIG. 18 is a side assembled view of the safety brace of FIG. 15 and inllustrating a handle according to one embodiment of the present invention;

FIG. 19 is an top end view taken along the direction of the arrows of the line 19-19 in FIG. 18;

FIG. 27 is a an exploded view of a carrying case for three difference sized safety braces in accordance with an embodiment of the present invention.

DETAILED DESCRIPTION OF THE INVENTION

In the description herein with respect to the drawings, any reference to direction or orientation is purely informative and is employed for ease of reference. It is not intended as limiting the scope of the claims herein.

Figure 1:
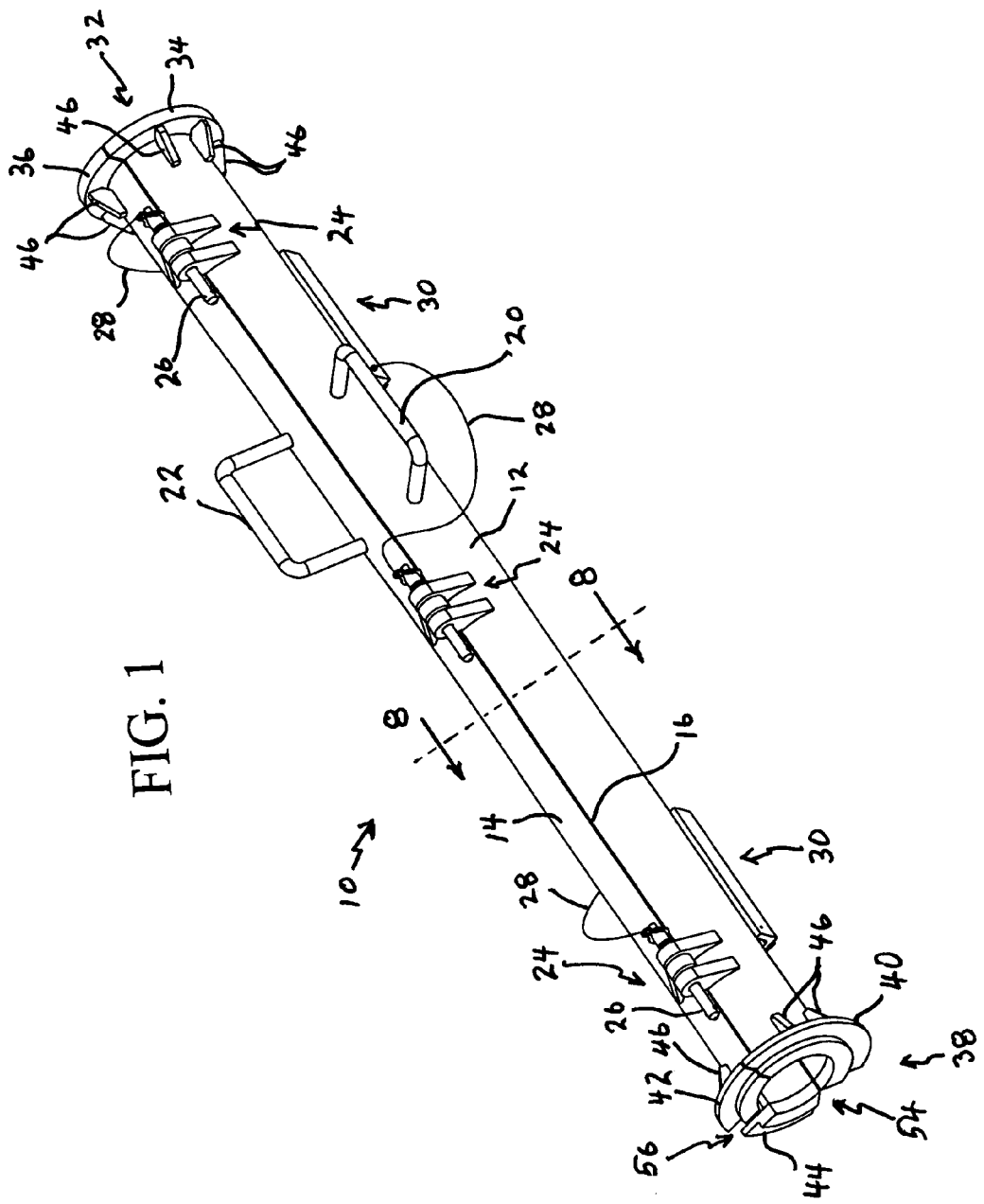
FIG. 1 is a top perspective view of a safety brace in accordance with an embodiment of the present invention.

Referring to FIG. 1, there is shown a top perspective view of a safety brace 10 which is formed of two generally semi-circular tubes, left tube 12 and right tube 14. These are configured and sized so that when coupled together along their corresponding top longitudinal seam 16 shown in FIG. 1 and bottom longitudinal seam 18 shown in FIG. 2 which is a bottom perspective view of the safety brace 10, they can fit around the drive shaft or lead screw of a hydraulic ram 19 shown in FIG. 21. In one embodiment, the drive shaft can be that of hydraulic ram used to raise and lower the radar antenna platform of the U.S. Army AN/TPQ-37(V)9 Radar Antenna. The safety brace of the present invention can also be used for drive shafts of other hydraulic rams to position other platforms.

As shown in FIG. 1, the safety brace 10 has handle 20 for left tube 12 and handle 22 for right tube 14. These handles 20, 22 are convenient for carrying the safety brace 10 and for positioning it around the drive shaft of the hydraulic ram 19. The tubes 12, 14 are coupled along their top seam 16 by separable coupling bracket assemblies 24 that are each kept together by removable locking pin 26 and lanyard 28 as shown in FIG. 1. The landyard 28 is connected at its one end to removable locking pin 26 and at its other end to a U shaped bracket 30 as shown in FIG. 3. In this manner, the landyard 28 is readily available for use and helps keep the pin 26 from being lost or misplaced. In the exemplary embodiment shown in FIGS. 1 and 2, the safety brace 10 has three bracket assemblies 24 with one positioned near the center and the other equidistant from the center and near the ends of the safety brace 10. Seam 18 is formed by coupling the tubes 12, 14 with two U-shaped hinged coupling bracket assembly 30, one positioned near the top or upper end and the other positioned near the lower or bottom end of safety brace 10.

The safety brace 10 has an upper or top flange 32 formed of two portions, a left portion 34 and a right portion 36. A lower or bottom flange 38 is formed of three portions, a left portion 40 and a right first portion 42 and a right second portion 44. The top and bottom left flange portions 34 and 40 are attached to the top and bottom end edges of left tube 12. Similarly, the top right flange portion 36 is attached to the top end edge of right tube 14 and the bottom right flange portions 42 and 44 are attached to the bottom end edge of right tube 14.

The safety brace 10 has generally triangular gussets 46 positioned by welding or other suitable methods between the top flange 32 and tubes 12 and 14 and also between the bottom flange 38 and tubes 12 and 14. As shown for example in FIGS. 3, 22 and 24, one edge of generally triangular gusset 46 is welded or otherwise secured to a corresponding end flange and another edge is welded or secured to a corresponding tube portion. One edge hence is free. In alternative embodiments, the gussets can be rectangular or be formed of other geometrical shapes.

Figure 8:
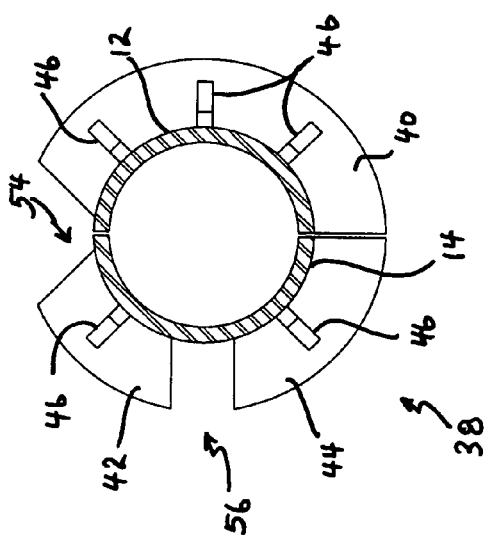
FIG. 8 is a cross-sectional view taken along the direction of the line 8-8 in FIG. 1 which illustrates the gussets positioned at the bottom end of the safety brace of FIG. 1.

In the exemplary embodiment shown in FIGS. 1, 2, 3, 8 and 11, there are three gussets 46 coupling each of flange portions 34, 36 and 40 with the corresponding end portions of tubes 12 and 14. As shown in FIG. 8, there is one gusset 46 coupling each of the bottom flange portions 42 and 44 to the bottom end portion of right tube 14. These gussets help provide increased strength which is critical in making certain that the safety brace 10 will perform properly and not collapse while personnel are working under the raised communications platform such as that for a radar antenna. In one embodiment, the gussets 46 are preferably uniformly spaced from one another with respect to flange portion 34, 36 and 40. The gussets 46 with respect to bottom flange portions 42 and 44 are positioned generally at the midpoints of those flange portions.

Figure 2:
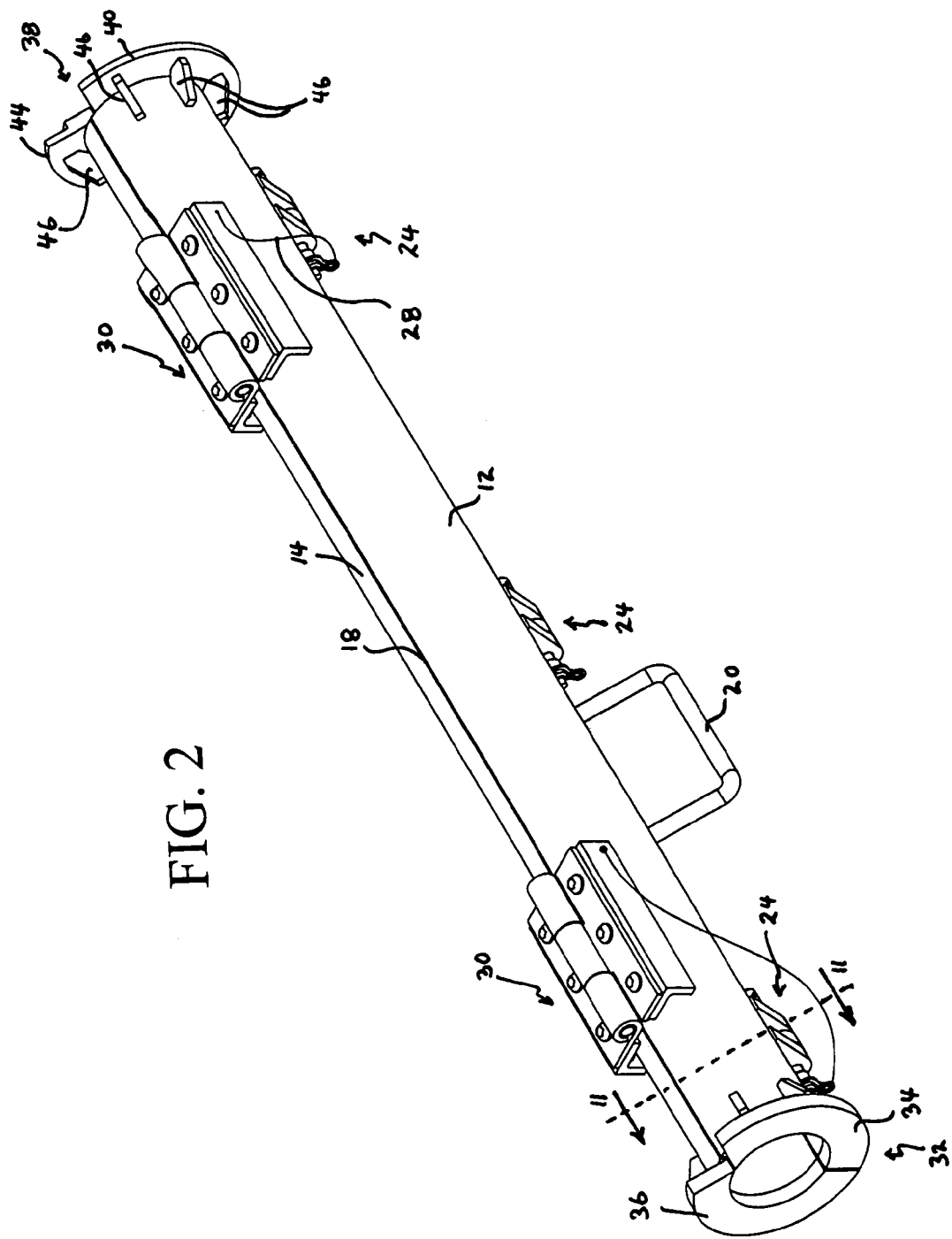
FIG. 2 is a bottom perspective view of the safety brace of FIG. 1.
Figure 3:
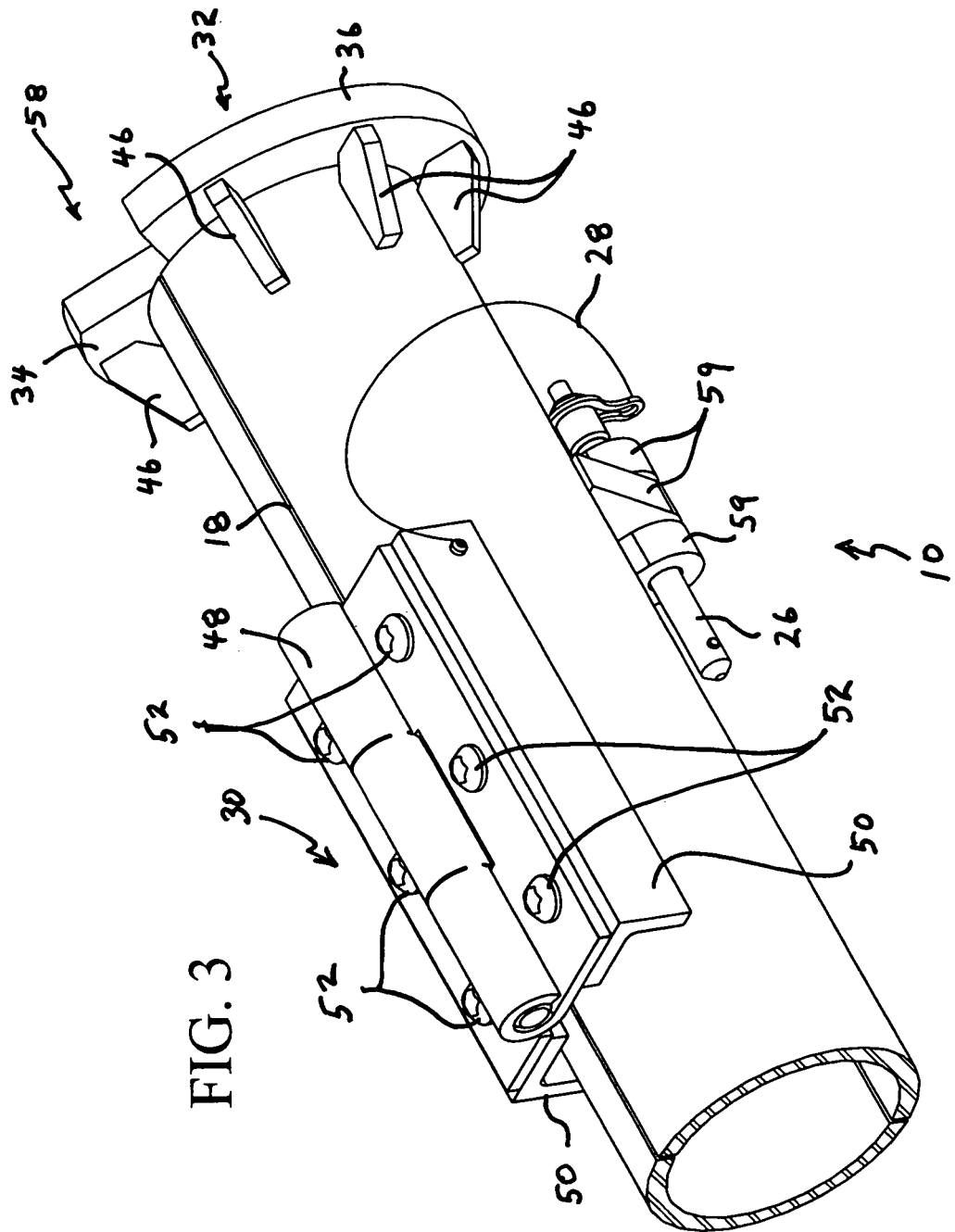
FIG. 3 is a partial enlarged view of the top end of the safety brace of FIG. 1 illustrating the hinge assembly and also illustrating the top flange and gussets in accordance with an embodiment of the present invention.

Referring to FIGS. 2 and 3, the safety brace 10 has a U-shaped bracket 30 positioned adjacent each of top flange 32 and bottom flange 38. As shown in FIG. 3, the U-shaped bracket 30 is formed of a hinge 48 that is positioned on top of two like shaped angles 50. The hinge 48 is fastened to the angles 50 by screws 52.

Figure 11:
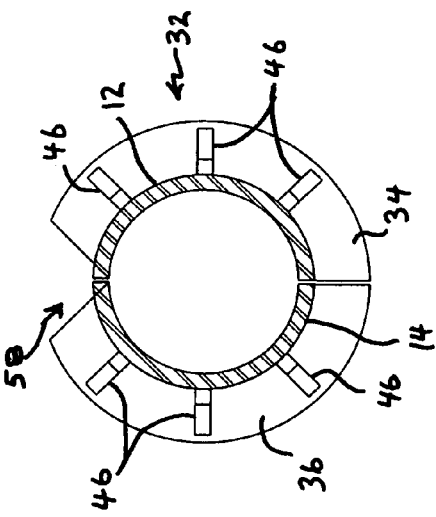
FIG. 11 is a cross-sectional view taken along the direction of the arrows of the line 11-11 in FIG. 2 which illustrates the gussets positioned at the top end of the safety brace of FIG. 1.
Figure 24:
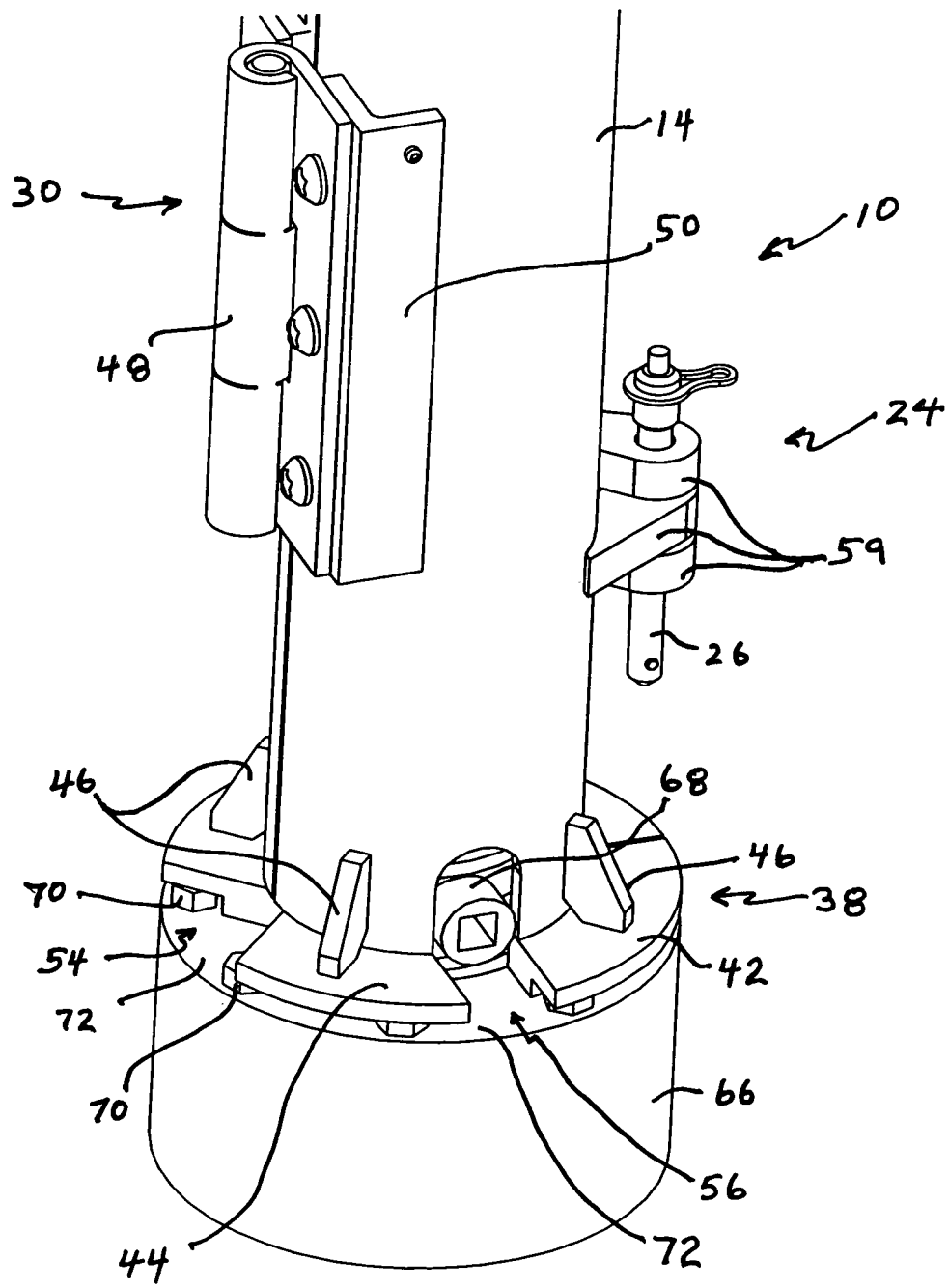
FIG. 24 shows the bottom end portion of the safety brace of the present invention deployed about the lead screw after the raised communications platform is lowered to rest securely on the safety brace.

In FIG. 4, the left tube 12 and right tube 14 are shown in separated pre-assembly form. Similarly the component top and bottom flanges 32 and 38 and their component flange portions 34 and 36 for top flange 32 and flange portions 40, 42 and 44 for the bottom flange 38 are shown in their pre-assembled form. The flange portions 34, 36, 40, 42 and 44 are fastened to their respective tubes by welding or other suitable methods. FIG. 5 illustrates the flange components after being welded to the left tube 12 and right tube 14. The flange portions 40, 42 and 44 of the bottom flange 38 have elevated lands 53, 55 and 57, respectively, as shown in FIG. 6 to help accommodate the seating of the safety brace 10 as will be further described below. The flange portions 40, 42 and 44 of bottom flange 38 form notches or openings 54 and 56, as shown in FIGS. 7 and 8. Notch 54, as shown for example in FIGS. 8 and 17, is formed between bottom flange portions 40 and 42. This notch 54 provides clearance in bottom flange 38 between the flange portions as the tube halves 12 and 14 open along top seam 16. Similarly, notch 58, as show for example in FIGS. 3, 11 and 19, is formed between top flange portions 34 and 36. Notch 58 also provides clearance in the top flange 32 between the flange portions as the tube halves 12 and 14 open along top seam 16. As to notch 56, this is formed between flange portions 40 and 42, as shown in FIGS. 8 and 17, and is also formed by a cutout in the adjacent wall of tube half 14. As shown in FIGS. 15 and 24, notch 56 accommodates the seating of the bottom flange 38 about the grease fitting 68 of speed gear assembly 66.

Figure 10:
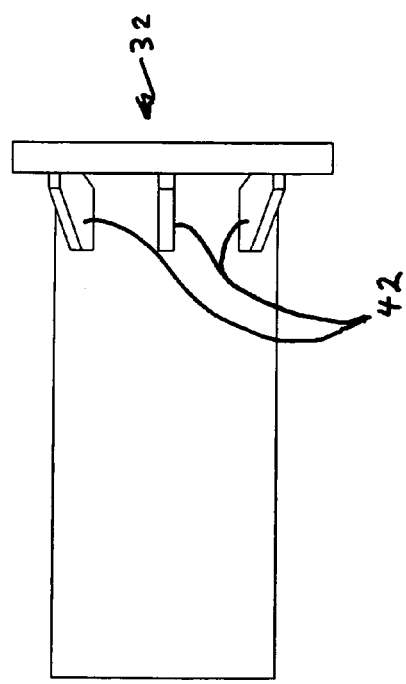
FIG. 10 is a side view of the top end of the safety brace of FIG. 11.

After the top and bottom flanges are attached to the tube halves, the gussets 46 can be attached to securely retain the top and bottom flanges together with the tube halves. As shown in FIGS. 8, 10 and 11, the assembled top flange 32 and bottom flange 38 have gussets 46 welded to the flange portions and the corresponding tube portions 12 and 14.

FIG. 13 illustrates the assembly of the U-shaped bracket 30. After the angles 50 all welded to the right tube 14 and left tube 12, the hinge 48 is positioned on top of the angles 50 and fastened by means of screws 52 which pass through corresponding holes in the hinge 48 and the tapped holes in angles 50. The other end of the lanyard 28 from bracket assembly 24 is secured to one of the angles 50 as shown in FIG. 13. The final assembled form of the U-shaped bracket 30 is shown in FIG. 12 and FIG. 14. In the preferred embodiment shown in FIG. 14, two U-shaped brackets 30 are positioned adjacent the ends of the safety brace 10.

According to one embodiment of a method of assembly of the safety brace 10, the bracket assemblies 24 can be attached to the left and right tubes 12, 14 as shown in FIGS. 15, 16 and 17. While three bracket assemblies 24 are shown in FIG. 15, additional bracket assemblies 24 can be used if desired. Preferably one bracket assembly 24 is positioned adjacent to each of top flange 32 and bottom flange 38. A third bracket assembly 24 is positioned at about the middle of the safety brace 10 as shown in FIG. 15. Referring to FIG. 17, the bracket assembly 24 is formed of three like shaped extension members or tabs 59. One of the extension members is fastened by welding to right tube 14 while the other two extension members 59 are welded to the left tube 12. The right tube 14 extension number 59 is positioned between the of the two extension members 59 welded to the left tube 12. Each of the extension members 59 has an opening which is dimensioned to allow a locking pin 26 to pass through the opening. The lanyard 28, as shown in FIGS. 15 and 16, is attached to the locking pin 26 by means of a clip 27 which fits about the locking pin 26. The one end of the lanyard 28 is connected to the clip 27 and at its other end to one of the angles 50 of U-shaped bracket 30. In this fashion, the lanyard 28 is made readily available so that the pin 26 is not lost or misplaced during use.

Figure 20:
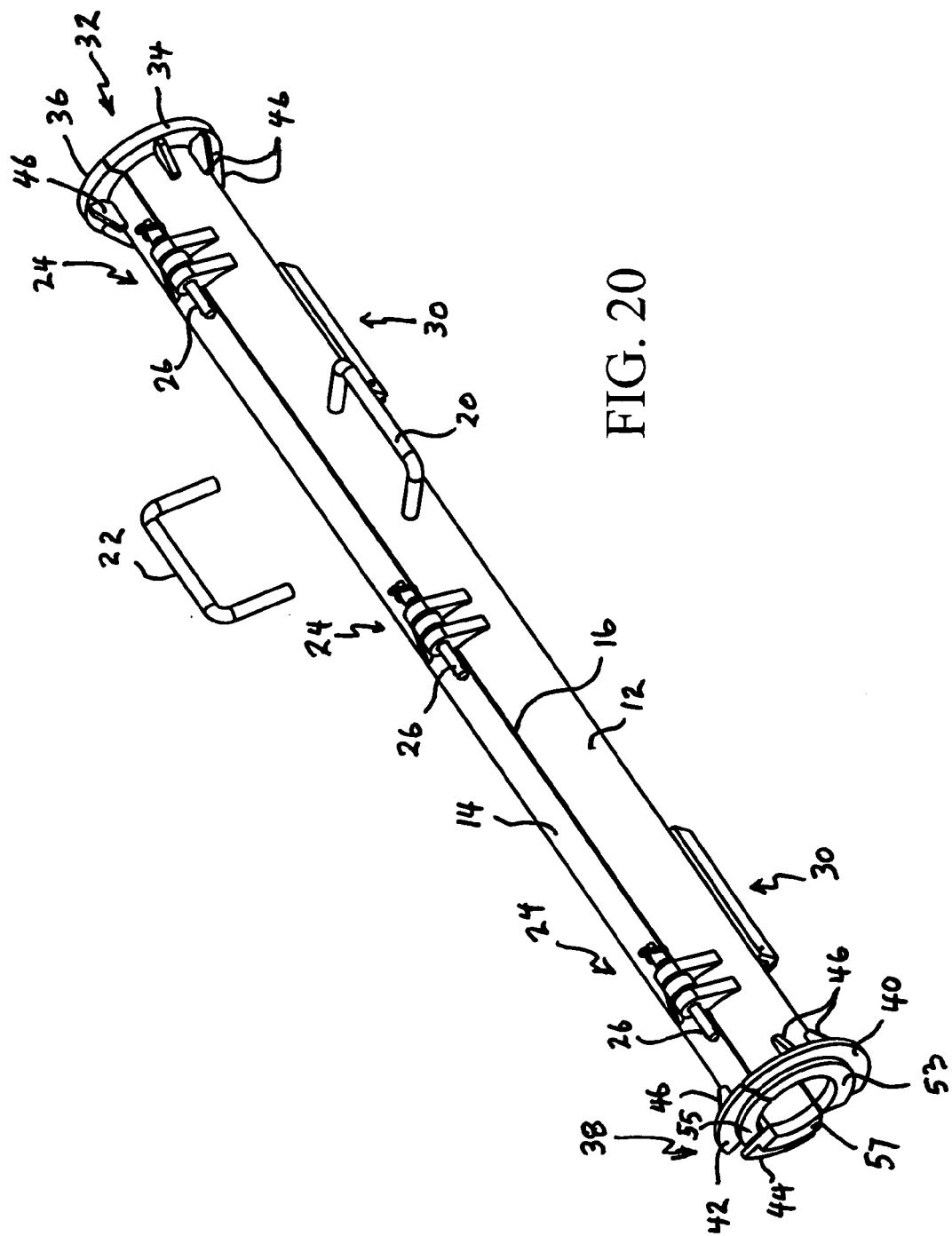
FIG. 20 is a perspective view showing one of the handles before attachment to the safety brace as shown fully assembled in FIG. 18.

The U-shaped handles 20 and 22 can next be welded to the left tube 12 and right tube 14, respectively as shown in FIGS. 18, 19 and 20. These handles 20 and 22 are useful during the positioning and deployment of the safety brace 10 about the hydraulic ram 19 of a communications platform.

Figure 21:
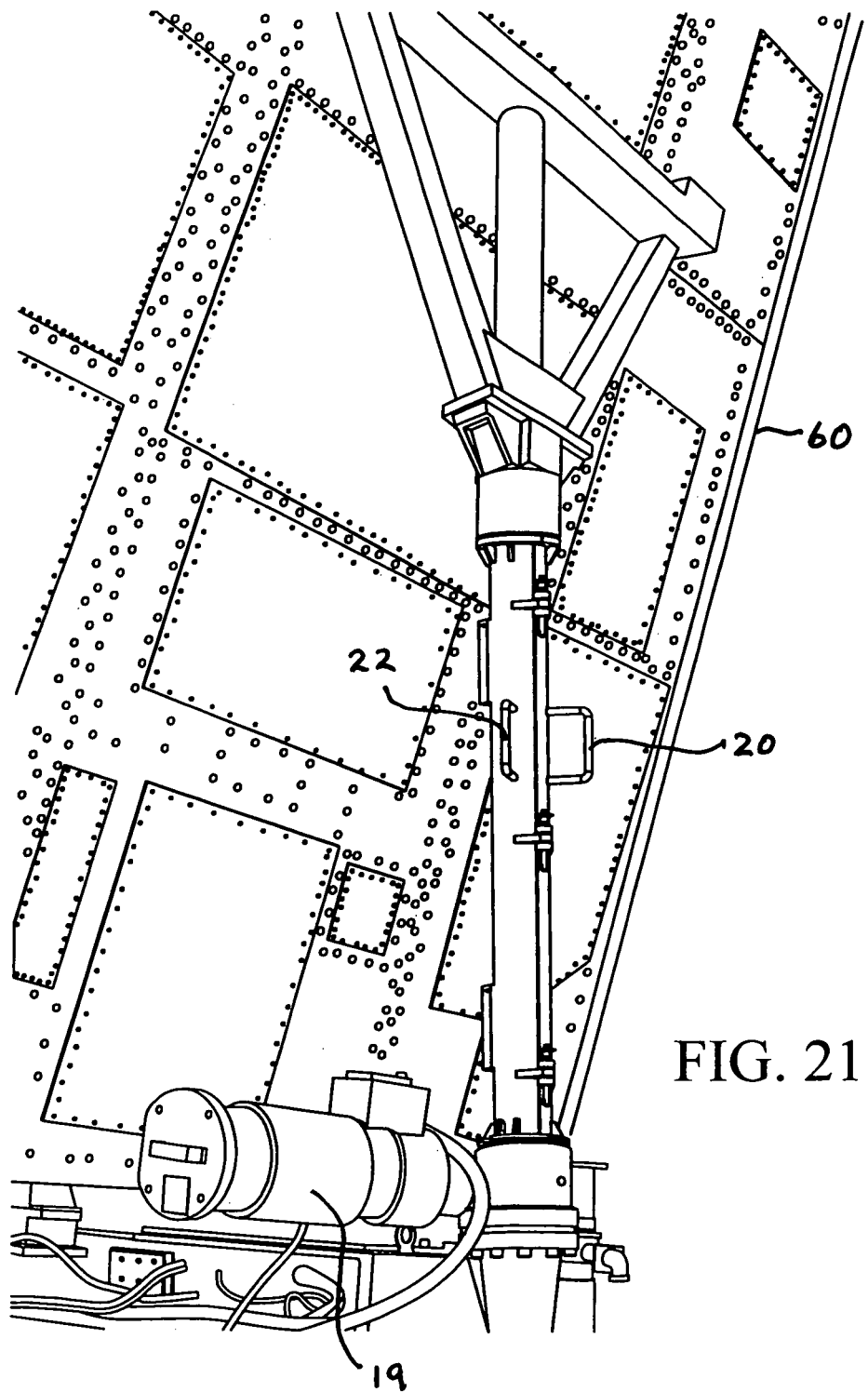
FIG. 21 shows the safety brace of the present invention in use with a raised communications platform.
Figure 22:
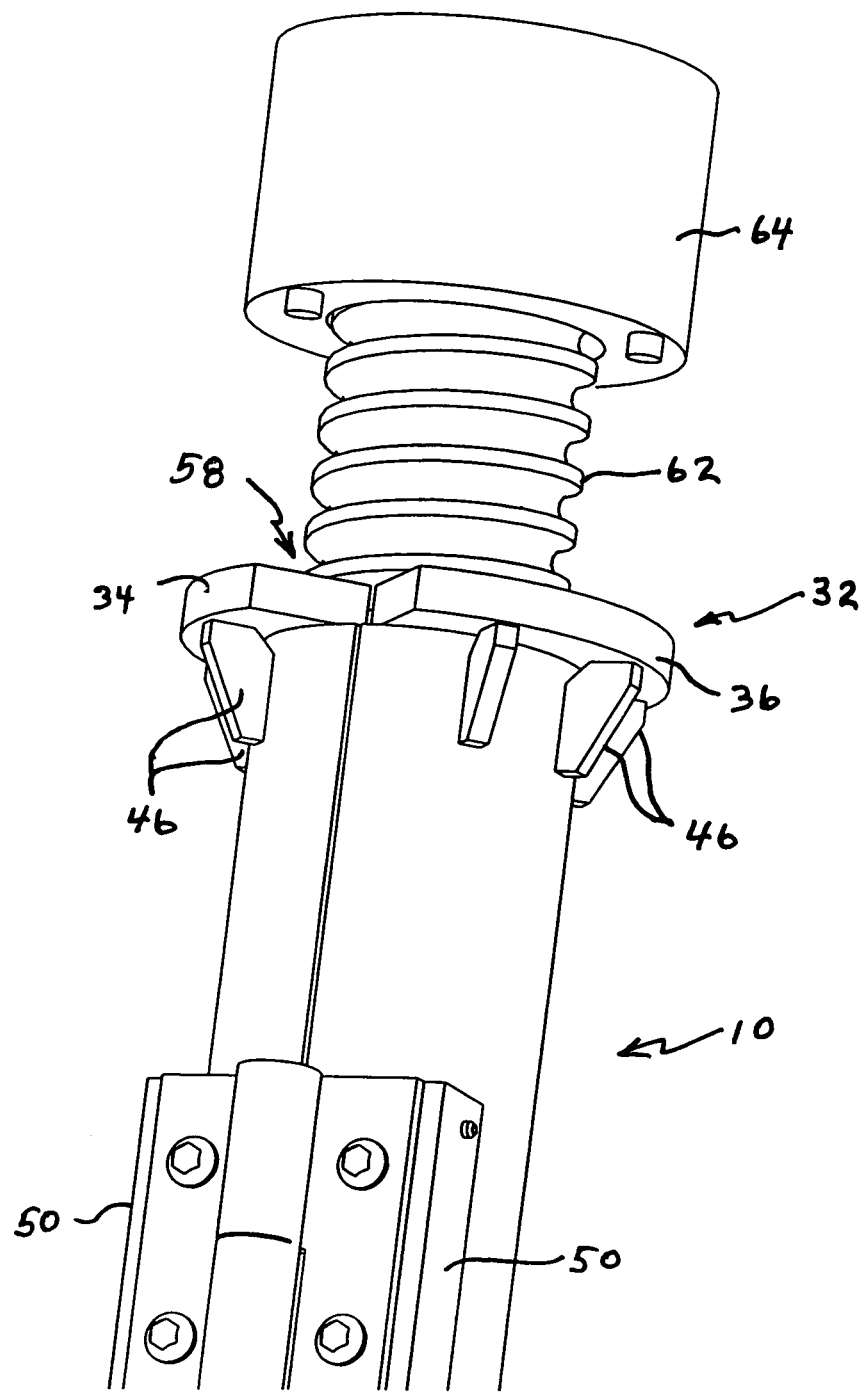
FIG. 22 shows the top end portion of the safety brace of the present invention deployed about the lead screw before the raised communications platform is lowered to rest securely on the top end of the safety brace.
Figure 23:
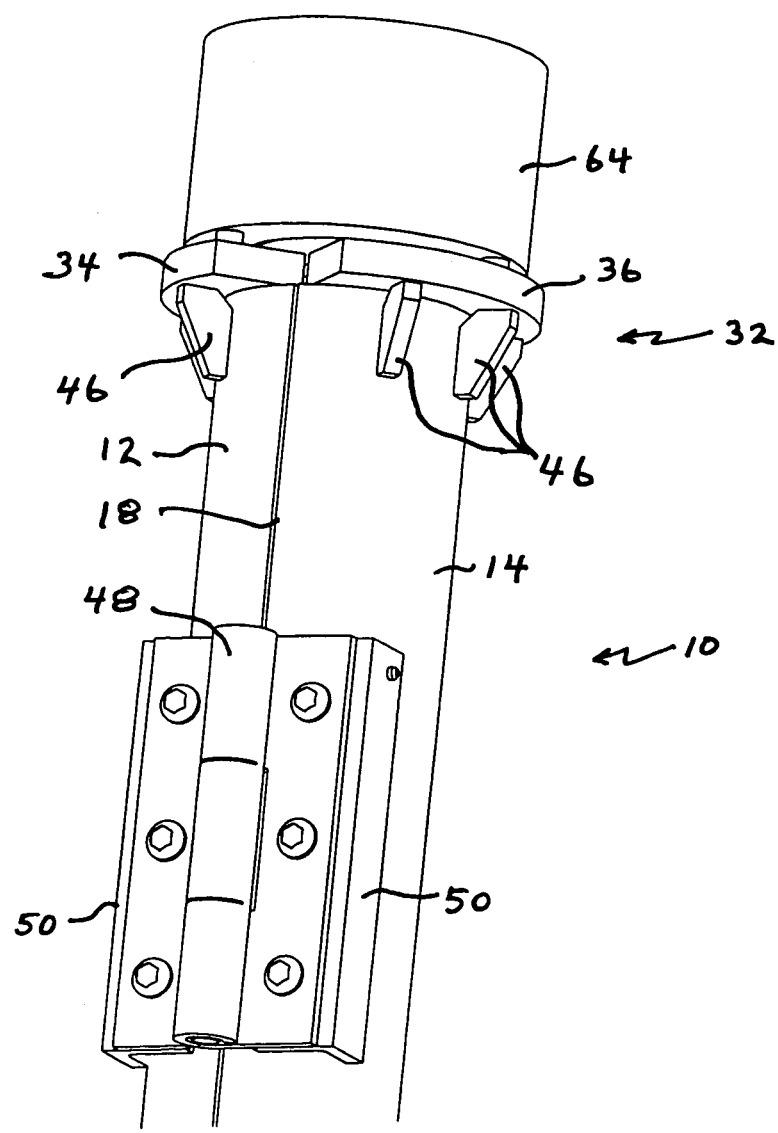
FIG. 23 shows the top end portion of the safety brace of the present invention deployed about the lead screw after the raised communications platform is lowered to rest securely on top end of the safety brace.
Figure 25:
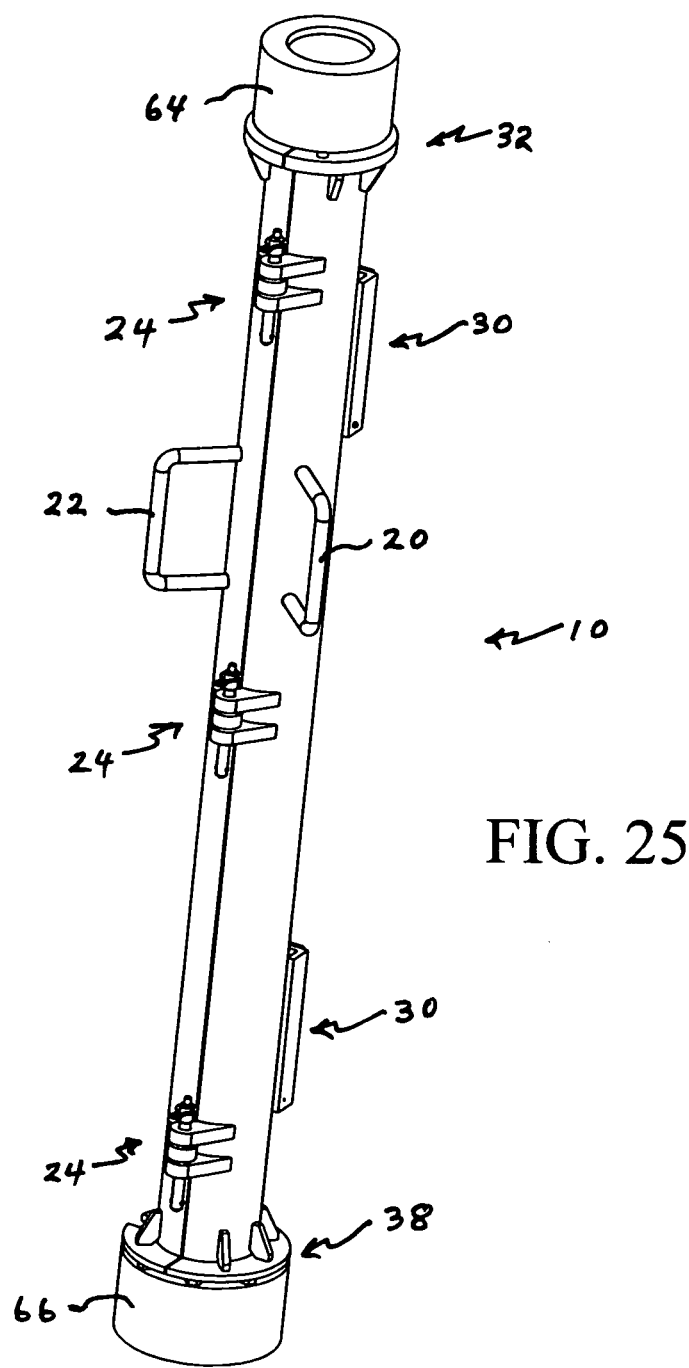
FIG. 25 shows the safety brace of the present invention deployed about the lead screw after the raised communications platform is lowered to rest securely on the safety brace.

The safety brace 10 is shown in FIG. 21 supporting a platform 60 for a communications device such as a radar antenna. To achieve this supporting operation, the handles 20, 22 are used to place the safety brace 10 in the appropriate position. The tube halves 12 and 14 are opened after the locking pins 26 of bracket coupling assemblies 24 are removed from the extension members 59. The tube halves open via the hinges 48 of the U-shaped brackets 30 and are placed around the lead screw 62 which is coupled to the ballscrew receptacle 64 as shown in FIG. 22. The opening of the tube halves 12 and 14 is aided by the clearances provided by notch 54 in the bottom flange and notch 58 in the top flange 32. The bottom flange 38 rests against the speed gear assembly 66 with the notch 56 clearing the grease fitting 68 as shown in FIG. 24. The top flange 32 rests against the ballscrew receptacle 64 as shown in FIG. 23. Both halves of the tubes 12 and 14 are closed while using the handles 20 and 22 until the holes in the interlocking tabs or extension members 59 align. A locking pin 26 is then placed through the three holes of the extension members 59 to ensure proper installation of the safety brace 10. This is repeated for multiple locking bracket coupling assemblies 24 where applicable. The antenna is lowered so that the ballscrew assembly 64 shown in FIGS. 22 and 23 comes to within about 0.5 inches of the top flange 32 after the operator is safely out of the way. After further proper positioning, the top and bottom flanges 32 and 38 securely abut the ballscrew receptacle 64 and rests on the speed gear assembly 66 as shown in FIG. 25 so that the safety brace 10 supports the platform 60.

As shown in FIGS. 20 and 24, the elevated portions or lands 53, 55 and 57 of bottom flange portions 40, 42 and 44 help to accommodate the irregular surface of the speed gear assembly 66. As shown, the bolt heads 70 rest against the non elevated portions or lands of the respective bottom flange portions. The elevated portions 53, 55 and 57 rest on the top face surface 72 of the speed gear assembly 66 as shown in FIG. 24. The final supporting configuration of safety brace 10 is shown in FIG. 25.

Figure 26:
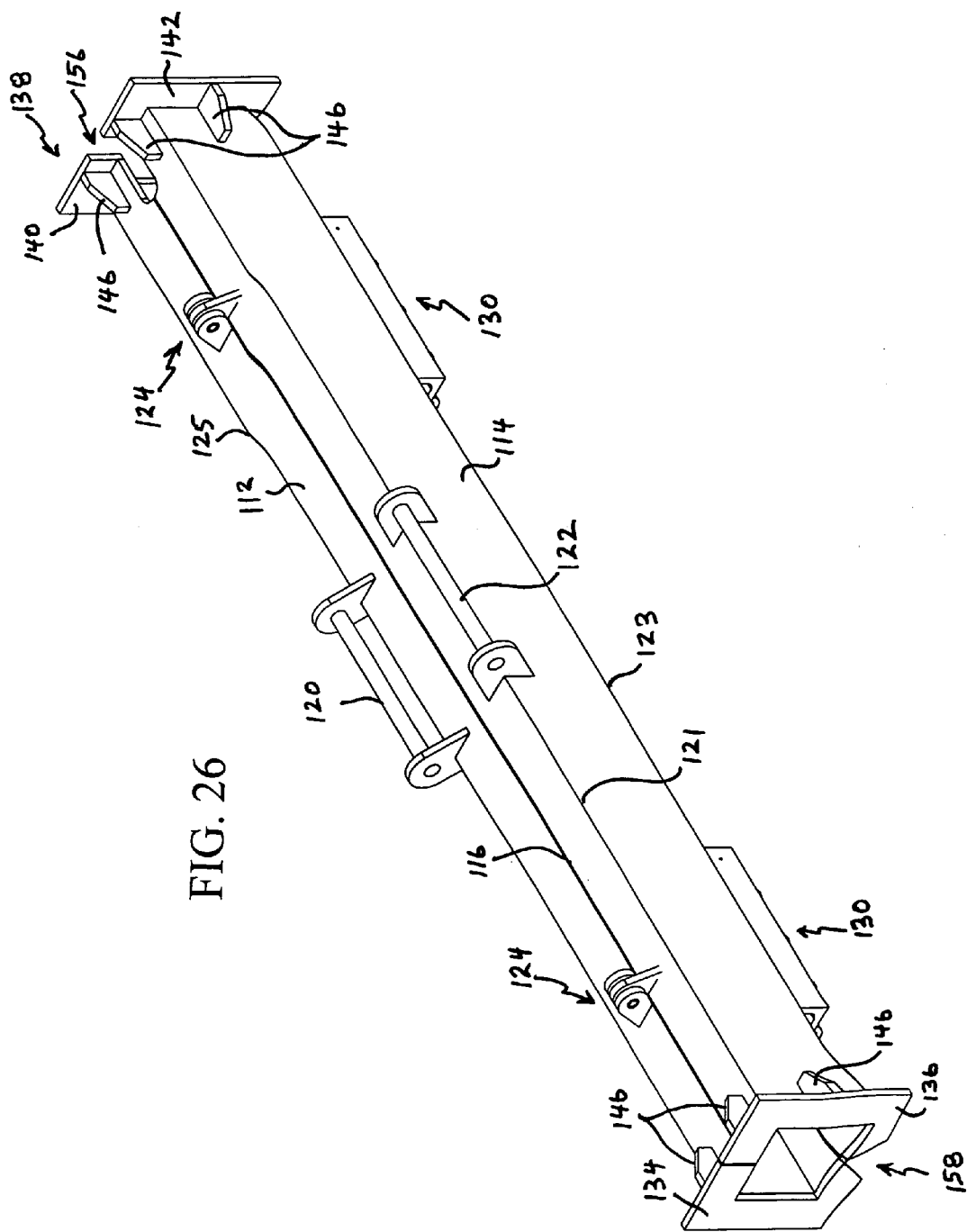
FIG. 26 is a perspective view of a safety brace of the present invention in accordance with an alternative embodiment of the present invention.

In an alternative embodiment, the safety brace 100 can be rectangular in cross-section as shown in FIG. 26. In this embodiment the left and right tubes 112 and 114, respectively, are U-shaped in cross-section. In this embodiment, each tube has two edges. For example, as shown in FIG. 26, tube 114 has two longitudinal edges 121 and 123. Similarly tube 112 has edges, only one of which 125 is shown in FIG. 26. The embodiment in FIG. 26 has similar components as those in the embodiment shown in FIGS. 1 and 2. For convenience and ease of reference, the similar components in FIG. 26 use the same reference number which is increased by 100 in the FIG. 26 embodiment. When assembled by means of bracket coupling assemblies 124 and U-shaped coupling assemblies 130, the cross-section of the finely assembled safety brace 100 is generally rectangular. In this embodiment, the top flange is formed of two flange portions 134 and 136 that together are also rectangular when assembled and positioned about the lead screw 62. Similarly, the bottom flange 138 is formed of two flange portions 140 and 142 that when assembled are also rectangular and are configured to allow for notch 156 to accommodate the grease fitting 68 of the speed gear assembly 66. In this embodiment, three gussets 146 are used to further secure each of the four various flange portions 134, 136, 140 and 142 to the corresponding tube halves 112 and 114.

Figure 9:
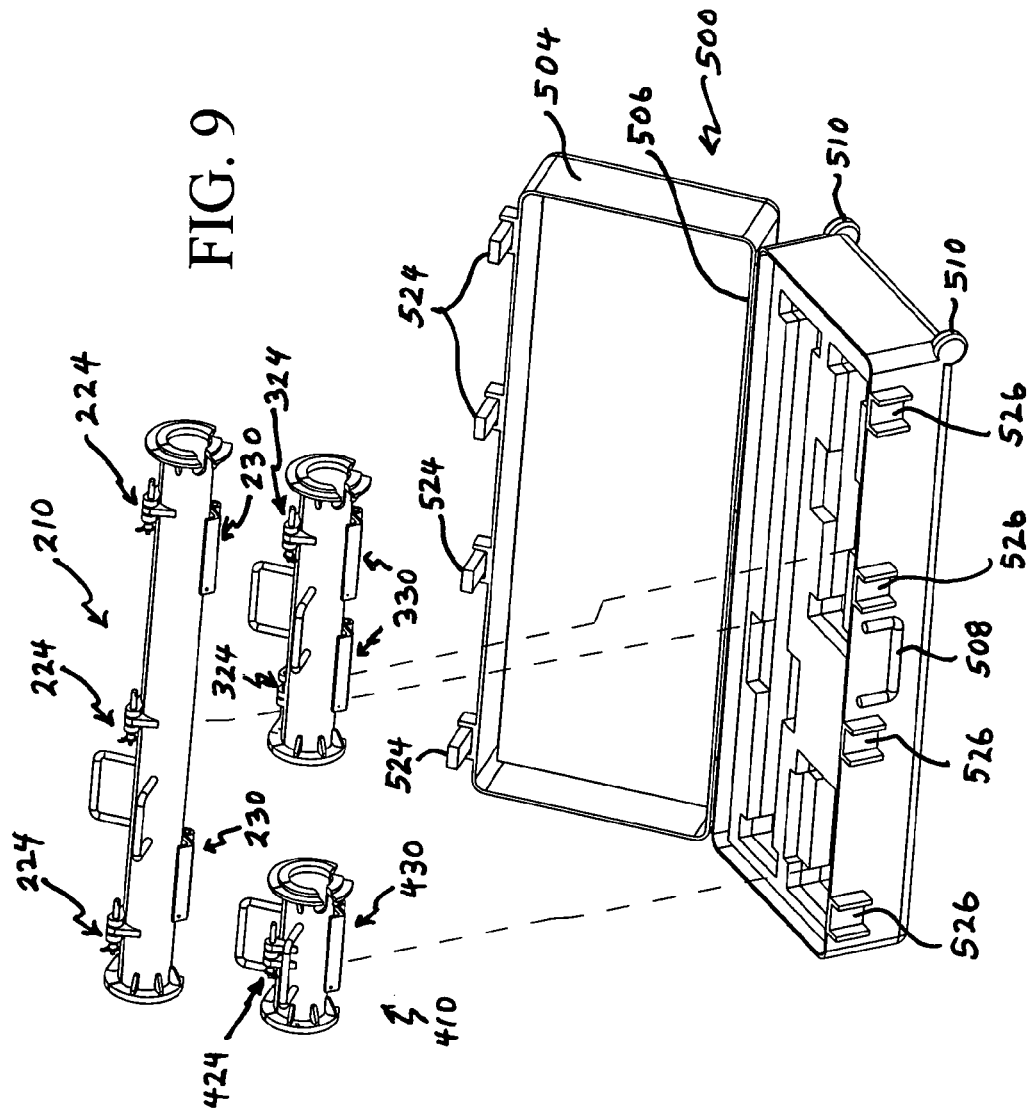
FIG. 9 is an exploded view of an assembled carrying case for three different sized safety braces shown above before being inserted into the carrying case in accordance with an embodiment of the present invention.

To accommodate different degrees of elevation of the antenna platform, different sized safety braces 210, 310 and 410 can be made and kept on hand as shown in FIG. 9. In one preferred embodiment, the three different sized safety braces can be 44 inches, 22 inches and 11 inches long. As shown in FIG. 29, the largest sized safety brace 210 has three bracket coupling assemblies 224 and two U-shaped brackets 230. The middle sized safety brace 310 has two bracket coupling assemblies 324 and two. U-shaped brackets 330. Finally the smallest sized safety brace 410 has one bracket assembly 424 and one U-shaped bracket 430. In alternative embodiments and in addition to employing each of safety braces 210, 310 and 410 individually, various combinations of two or more of the safety braces 210, 310 and 410 can be used. If desired, various combinations of two or even three of the different sized safety braces 210, 310 and 410 can be used to accommodate various amounts of elevation of the antenna platform. For example, safety braces 210 and 310, 210 and 410, 310 and 410 can be used. Alternatively, all three can be used. Depending on the platform to be raised, more than three safety braces can be employed. One advantage is that several smaller sized safety braces can be more easily handled by personnel rather than a much larger single unit safety brace that might be required for a greater degree of elevation.

To provide for convenient transportation and to protect the safety braces from damage, a case 500 is provided to safely carry these various sized safety braces 210, 310 and 410. Referring to FIGS. 27 and 9, a case 500 includes a bottom rectangular box portion 502 and a top rectangular box portion 504 which are hinged together along common seam 506.

The bottom box 502 has a handle 508 and a pair of wheels 510 to facilitate handling and movement of the case 500. The inner surfaces of the top and bottom portions 502, 504 are corrugated as shown in FIG. 27 for increased strength. Four foam inserts 512, 514, 516 and 518 are configured and dimensioned to fit within bottom box 502. Inserts 512, 514 and 516 have corresponding and cooperating cutouts as shown in FIGS. 27 and 9 to receive and secure the different sized safety braces 210, 310 and 410. The different sized safety braces can be inserted into the cutouts along the direction of the dotted lines shown in FIG. 9. Two foam inserts 520 and 522 are configured and dimensioned to fit within the top box 504 as shown in FIGS. 27 and 9. Top box 504 has four latches 524 which are sized to fit snugly within corresponding latch receivers 526 on bottom box 502 so as to allow for secure closure of the case 500.

The different sized safety braces will allow for different angles of elevation of the antenna platform depending on the application. The tube is split longitudinally to allow the assembly to go over a mechanical lead screw. It is locked in place with interlocking tabs or extension members 59 and a quick release pin 26. The pin contains a lanyard that will keep it with the assembly. Flanges rest against the bolts or plate at both the top and bottom. The bottom part of the assembly contains a notch for the grease fitting. The entire assembly can be made of aluminum 6061-T6 to make it lightweight. However, other material can be used. Two handles make the system ergonomic.

A wind load of 50 mph was simulated on the antenna using the computational fluids analysis program, CF Design. Given the geometry of the antenna and lead screw, the compressive loads through the safety brace were calculated. Extensive finite element analysis (FEA) using COSMOS was performed on the three different size safety braces to ensure the strength and to optimize the final design. FEA was run without the gussets revealing a stress concentration where the flange joins the tubing. FEA was then run with the gussets of the present invention, showing that the stress concentration was eliminated. According to the analysis, the configurations provided herein can handle a load four times the predicted load before it will break, giving a safety factor of four with the worst case loading scenario.

While the present invention has been described in connection with what are presently considered to be the most practical and preferred embodiments, it is to be understood that the present invention is not limited to these herein disclosed embodiments. It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components, arrangements and dimensions can achieve the results described herein, without departing from the spirit and scope of this invention. Accordingly, the present invention should not be limited by the foregoing description, but only by the appended claims.

We claim:

1. A safety brace for supporting a radar antenna platform movable to an elevated tilted position by a drive shaft having a movable first member and a second member, wherein the first member is movable toward and away from the second member, comprising:
    an elongated generally cylindrical tube formed of a separable first half tube portion and a second half tube portion, said first half tube portion and said second half tube portion each being generally C shaped in cross section and forming longitudinal first and second seams when positioned alongside each other to form the generally cylindrical tube, said elongated generally cylindrical tube having a first end and a second end;
    at least one separable coupling bracket secured to the first half tube portion and said second half tube portion and disposed across said first seam to maintain said first half tube and said second half portions in a generally closed seam configuration when said separable coupling bracket is in a closed position and to maintain said first half tube and said second half portions in an open seam configuration when said separable coupling bracket is opened;
    at least one hinged coupling bracket secured to said first half tube portion and said second half tube portion and disposed across said second seam to maintain said first half tube and said second half portions in a generally closed seam configuration when said hinged coupling bracket is in a closed position and to allow for opening of the second seam as the hinged coupling bracket is opened;
    a first flange disposed at said first end of said elongated generally cylindrical tube and being configured to abut against the movable first member of the drive shaft;
    a second flange disposed at said second end of said elongated generally cylindrical tube and being configured to abut against the second member of the drive shaft;
    a plurality of first gussets disposed between said first flange and adjacent outer surface portions of said first half tube portion and said second half tube portion; and
    a plurality of second gussets disposed between said second flange and adjacent outer surface portions of said first half tube portion and said second half tube portion; and
    at least one generally C shaped handle secured to one of said separable first half tube portion and said second half tube portion.

2. The safety brace of claim 1 further comprising three separable coupling brackets spaced apart along said first seam.

3. The safety brace of claim 1 wherein each separable coupling bracket comprises:
    a first separable coupling member disposed on said first half tube portion and a second separable coupling member disposed on said second half tube portion, and
    a locking pin;
    said first and second separable coupling members each having an aperture therethrough which line up when said elongated generally cylindrical tube is in the closed configuration whereupon the locking pin can be inserted through said apertures of said first and said second coupling members and lock said elongated generally cylindrical tube in said closed configuration.

4. The safety brace of claim 3 further comprising a lanyard secured at one end to said locking pin and at its other end to an adjacent hinged coupling bracket.

5. The safety brace of claim 1 wherein each hinged coupling bracket comprises:
    a first hinged coupling member disposed on said first half tube portion and a second hinged coupling member disposed on said second half tube portion, and
    a hinge plate secured to said first and said second hinged coupling members across said second seam.

6. The safety brace of claim 1 further comprising two hinged coupling brackets spaced apart along said second seam.

7. The safety brace of claim 1 wherein each of said first and said second plurality of gussets is generally triangular with one edge secured to a corresponding end flange and another edge secured to a corresponding tube portion.

8. The safety brace of claim 1 wherein each of said generally C shaped first half tube portion and said generally C shaped second half tube portion are generally rectangular in cross section when in the closed configuration.

9. The safety brace of claim 1 wherein each of said first flange and said second flange are generally rectangular.

10. The safety brace of claim 1 wherein said second flange is configured and dimensioned to accommodate any non flat surface of the second member of the drive shaft against which the second flange abuts.

11. The safety brace of claim 10 wherein said second flange together with corresponding adjacent sections of said first half tube portion and said second half tube portion are configured and dimensioned to form a notch to accommodate a grease fitting of said second member.

12. The safety brace of claim 1 wherein said first flange is configured and dimensioned to accommodate any non flat surface of the first member of the drive shaft against which the first flange abuts.

13. A safety brace system for supporting a platform movable to an elevated position by a ram having a base member, a lead screw and a moveable member, comprising:
    an elongated generally cylindrical tube formed of a separable first half tube portion and a second half tube portion, said first half tube portion and said second half tube portion each being generally C shaped in cross section and forming longitudinal first and second seams when positioned alongside each other to form the generally cylindrical tube, said elongated generally cylindrical tube having a first end and a second end;

at least one separable coupling member secured to said first half tube portion and said second half tube portion and disposed across said first seam to maintain said first half tube and said second half portions in a generally closed seam configuration when said separable coupling member is in a closed position and to maintain said first half tube and said second half portions in an open seam configuration when said separable coupling member is opened;

at least one hinged coupling member secured to said first half tube portion and said second half tube portion and disposed across said second seam to maintain said first half tube and said second half portions in the generally closed seam configuration when said hinged coupling member is in the closed position and to allow for opening of the second seam as the hinged coupling member is opened;

a first flange disposed at said first end of said elongated generally cylindrical tube and being configured to abut against the movable member of the ram;

a second flange disposed at said second end of said elongated generally cylindrical tube and being configured to abut against the base member of the ram;

a plurality of generally triangular first gussets disposed between said first flange and adjacent outer surface portions of said first half tube portion and said second half tube portion; and a plurality of generally triangular second gussets disposed between said second flange and adjacent outer surface portions of said first half tube portion and said second half tube portion, said first flange is configured and dimensioned to accommodate any non flat surface of the moveable member of the ram against which the first flange abuts.

14. The safety brace system of claim 13 wherein each separable coupling member comprises:

a first separable coupling extension member disposed on and extending from said first half tube portion and a second separable coupling extension member disposed on and extending from said second half tube portion, and a locking pin;

said first and second separable coupling extension members each having an aperture therethrough which line up when said elongated generally cylindrical tube is in the closed configuration whereupon the locking pin can be inserted through said apertures of said first and said second extension coupling members and lock said elongated generally cylindrical tube in said closed configuration.

15. The safety brace system of claim 13 wherein each hinged coupling member comprises:

a first hinged coupling member disposed on said first half tube portion and a second hinged coupling member disposed on said second half tube portion, and a hinge plate secured to said first and said second hinged coupling members across said second seam.

16. The safety brace system of claim 13 wherein each of said first and said second plurality of gussets is generally triangular with one edge secured to a corresponding end flange and another edge secured to a corresponding tube portion.

17. The safety brace system of claim 13 further comprising at least one generally C shaped handle secured to one of said separable first half tube portion and said second half tube portion.

18. The safety brace system of claim 13 wherein said second flange is configured and dimensioned to accommodate any non flat surface of the base member of the ram against which the second flange abuts.

19. The safety brace system of claim 18 wherein said second flange comprises lands to accommodate the non flat surface of the base member.

20. The safety brace system of claim 18 wherein said second flange together with corresponding adjacent sections of said first half tube portion and said second half tube portion are configured and dimensioned to form a notch to accommodate a grease fitting of the base member.

21. The safety brace system of claim 13 further comprising a transport case.

22. A method of supporting a platform movable to an elevated position by a ram having a base member, a lead screw and a moveable member, comprising:

providing a safety brace comprising:

an elongated generally cylindrical tube formed of a separable first half tube portion and a second half tube portion, said first half tube portion and said second half tube portion each being generally C shaped in cross section and forming longitudinal first and second seams when positioned alongside each other to form the generally cylindrical tube, said elongated generally cylindrical tube having a first end and a second end;

at least one separable coupling member secured to said first half tube portion and said second half tube portion and disposed across said first seam to maintain said first half tube and said second half portions in a generally closed seam configuration when said separable coupling member is in a closed position and to maintain said first half tube and said second half portions in an open seam configuration when said separable coupling member is opened;

at least one hinged coupling member secured to said first half tube portion and said second half tube portion and disposed across said second seam to maintain said first half tube and said second half portions in a generally closed seam configuration when said hinged coupling member is in a closed position and to allow for opening of the second seam as the hinged coupling member is opened;

a first flange disposed at said first said first end of said elongated generally cylindrical tube and being configured to abut against the moveable member of the ram;

a second flange disposed at said second end of said elongated generally cylindrical tube and being configured to abut against the base member of the ram;

a plurality of first gussets disposed between said first flange and adjacent outer surface portions of said first half tube portion and said second half tube portion; and a plurality of second gussets disposed between said second flange and adjacent outer surface portions of said first half tube portion and said second half tube portion;

positioning said elongated generally cylindrical tube in an open configuration about the lead screw after the platform is raised;

closing said elongated generally cylindrical tube about the lead screw;

abutting said second flange against the base member of the ram; and lowering the platform and abutting said first flange against the movable member of the ram.

23. The method of claim 22 further comprising providing at least two different sized safety braces for use in supporting a platform.

* * * * *